(12) United States Patent
Burlak et al.

(10) Patent No.: US 7,904,260 B2
(45) Date of Patent: Mar. 8, 2011

(54) INTEGRATED CIRCUIT AND METHOD FOR CLASSIFICATION OF ELECTRICAL DEVICES AND SHORT CIRCUIT PROTECTION

(75) Inventors: Gary Joseph Burlak, Lake Orion, MI (US); Marian Mirowski, West Bloomfield, MI (US)

(73) Assignee: STMicroelectronics, Inc., Coppell, TX (US)

( * ) Notice: Subject to any disclaimer, the term of this patent is extended or adjusted under 35 U.S.C. 154(b) by 307 days.

(21) Appl. No.: 12/039,065

(22) Filed: Feb. 28, 2008

(65) Prior Publication Data
US 2008/0208491 A1 Aug. 28, 2008

Related U.S. Application Data

(60) Provisional application No. 60/978,019, filed on Oct. 5, 2007, provisional application No. 60/920,465, filed on Mar. 27, 2007, provisional application No. 60/904,407, filed on Feb. 28, 2007.

(51) Int. Cl.
*G01R 19/00* (2006.01)

(52) U.S. Cl. ............................. 702/57; 702/60; 702/64; 307/9.1; 307/52

(58) Field of Classification Search ............. 702/57–65, 702/124–126, 183, 185, 189, 193, 198; 320/106; 324/426, 433; 307/1–87, 112–157
See application file for complete search history.

(56) References Cited

U.S. PATENT DOCUMENTS

| | | | |
|---|---|---|---|
| 4,500,775 A | 2/1985 | Sangu et al. |
| 5,030,938 A | 7/1991 | Bondzeit |
| 5,157,376 A | 10/1992 | Dietz et al. |
| 5,397,924 A | 3/1995 | Gee et al. |
| 5,611,695 A | 3/1997 | Bentley |
| 5,775,712 A | 7/1998 | Link et al. |
| 5,854,517 A | 12/1998 | Hines |
| 5,895,989 A | 4/1999 | Imaizumi et al. |
| 5,920,128 A | 7/1999 | Hines |
| 5,945,743 A | 8/1999 | Pattantyus et al. |

(Continued)

FOREIGN PATENT DOCUMENTS

DE 3936638 C1 3/1991

OTHER PUBLICATIONS

NHTSA; "Development, Evaluation, and Demonstration of a Tractor Trailer Intelligent Communication and Power Link—Truck Multiplexing Enclosure Final Report"; DOT HS 808685; Jan. 1998; pp. 1-24.

(Continued)

*Primary Examiner* — Mohamed Charioui
*Assistant Examiner* — Ricky Ngon
(74) *Attorney, Agent, or Firm* — Lisa K. Jorgenson; Andre M. Szuwalski

(57) ABSTRACT

An integrated circuit device and method for classifying electrical devices is disclosed. A reference current response of a plurality of electrical devices is determined and stored in a memory. Real-time current response of a specific electrical device is measured and stored in the memory. A processor compared the measured real-time current response of the specific electrical device to the reference current responses of the plurality of electrical devices. A classification of the electrical device is then made based on the comparison.

37 Claims, 6 Drawing Sheets

U.S. PATENT DOCUMENTS

| | | |
|---|---|---|
| 5,959,365 A | 9/1999 | Mantini et al. |
| 5,994,790 A * | 11/1999 | Nagashima et al. ......... 307/10.1 |
| 6,039,410 A | 3/2000 | Robertson et al. |
| 6,115,831 A | 9/2000 | Hanf et al. |
| 6,130,487 A | 10/2000 | Bertalan et al. |
| 6,259,170 B1 | 7/2001 | Limoge et al. |
| 6,369,460 B1 | 4/2002 | Endoh et al. |
| 6,498,403 B1 | 12/2002 | Hagidaira et al. |
| 6,545,600 B1 | 4/2003 | Boner |
| 6,630,747 B1 | 10/2003 | Kamada et al. |
| 6,630,749 B1 | 10/2003 | Takagi et al. |
| 6,642,628 B2 | 11/2003 | Burdick et al. |
| 6,700,386 B2 * | 3/2004 | Egami ..................... 324/503 |
| 6,804,098 B2 | 10/2004 | Pannwitz |
| 7,053,588 B2 | 5/2006 | Nakanishi et al. |
| 7,173,347 B2 * | 2/2007 | Tani et al. ................. 307/10.1 |
| 7,363,127 B2 | 4/2008 | Fogelstrom |
| 7,429,806 B2 * | 9/2008 | Bainbridge et al. ........... 307/52 |
| 7,557,540 B2 | 7/2009 | Kao et al. |
| 7,567,057 B2 | 7/2009 | Elder et al. |
| 7,598,708 B2 | 10/2009 | Kimura et al. |
| 7,675,266 B2 | 3/2010 | Nakano et al. |
| 2001/0040455 A1 | 11/2001 | Arlt et al. |
| 2002/0030403 A1 | 3/2002 | Lesesky et al. |
| 2003/0195668 A1 | 10/2003 | Radtke et al. |
| 2003/0200017 A1 | 10/2003 | Capps et al. |
| 2004/0119517 A1 | 6/2004 | Pauletti et al. |
| 2004/0189092 A1 | 9/2004 | Burlak et al. |
| 2004/0199344 A1 | 10/2004 | Oh |
| 2005/0253456 A1 | 11/2005 | Spilker |
| 2006/0125447 A1 | 6/2006 | Sugimoto |
| 2007/0252439 A1 * | 11/2007 | Menas et al. .................. 307/38 |
| 2008/0203975 A1 | 8/2008 | Burlak et al. |

OTHER PUBLICATIONS

James B. Brown; "4th International CAN Conference—Using DeviceNet in the Trailer Industry"; 1997; pp. 1-9.

* cited by examiner

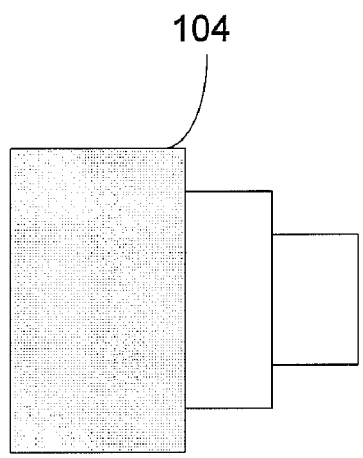
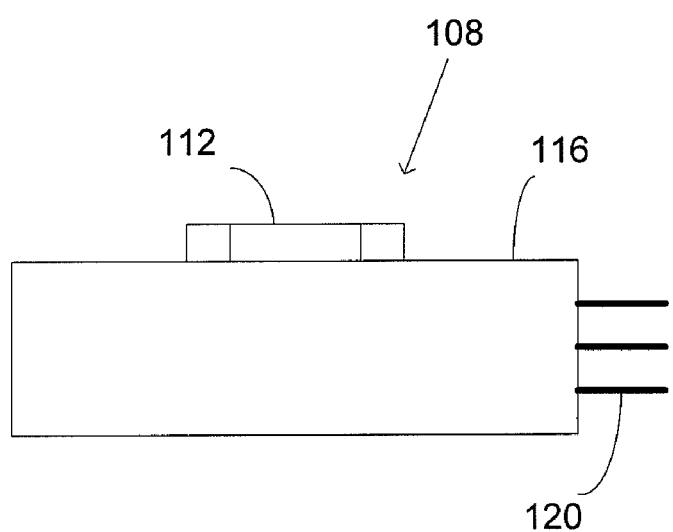
FIG. 1A
FIG. 1B

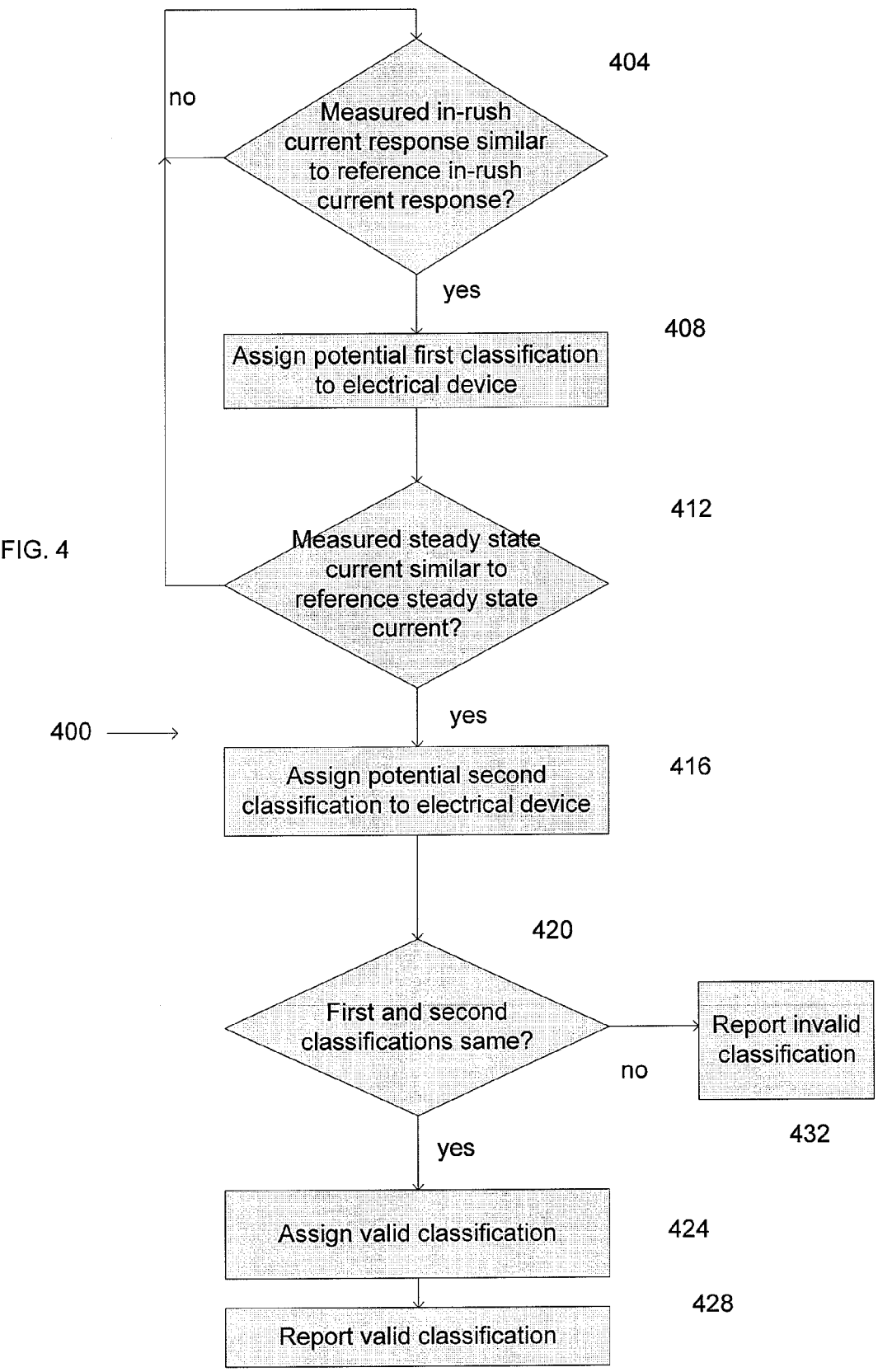

INTEGRATED CIRCUIT AND METHOD FOR CLASSIFICATION OF ELECTRICAL DEVICES AND SHORT CIRCUIT PROTECTION

CROSS-REFERENCE TO RELATED APPLICATIONS

Pursuant to 35 U.S.C. §119 (e), this application claims priority from, and hereby incorporates by reference for all purposes, U.S. Provisional Patent Application Ser. No. 60/978,019, entitled Smart Trailer Tow Connector, and filed Oct. 5, 2007, and U.S. Provisional Patent Application Ser. No. 60/920,465, entitled Enhanced Dynamic Trailer Detection, Exterior Lighting Classification and Short Circuit Protection Method, Improvement and Enhancement, and filed Mar. 27, 2007, and U.S. Provisional Patent Application Ser. No. 60/904,407, entitled Enhanced Dynamic Trailer Detection, Exterior Lighting Classification and Short Circuit Protection Method, and filed Feb. 28, 2007.

FIELD OF THE INVENTION

The invention relates to electronic circuits, and more particularly the invention relates to an integrated circuit and method for classification of electrical devices connected to a battery and short circuit protection.

BACKGROUND

In vehicles, aircrafts, telecommunications and other systems, batteries are often used to supply dc power to electrical devices (also referred to as electrical loads). Often, a power conversion circuit with a switched-mode dc-dc converter is used to deliver controlled power from the battery to the electrical loads. In automotive electrical systems one or more batteries are connected to a charging system that may be active whenever the powertrain, i.e., engine, is running, Additionally, hybrid or other powertrain systems may regenerate power and charge batteries or other storage devices under specific vehicle conditions, e.g., braking. Independent of the power source, electrical power is typically distributed to all vehicle electronics either as a direct or switched battery power feed.

In many applications, it is desirable to automatically identify (i.e., classify) the type of electrical loads connected to the battery. If the electrical loads can be automatically classified, short circuit current limits can be determined. If a short circuit condition is detected, load shedding may be initiated by selective removal of one or more electrical loads to prevent the battery from being completely discharged.

In vehicles designed to tow trailers, a trailer tow connector and the electrical components installed in the vehicle to control trailer loads are typically used to deliver electrical power to the trailer and also to monitor and control various devices or loads installed in the trailer. The trailer tow connector generally includes one or more output ports or pins adapted to deliver electrical power to the trailer devices or loads. The devices may include running lights, brake lights, parking lights, electric brakes, auxiliary battery, backup lights, fog lights and turn signals. Selected output ports or pins in the trailer tow connector are usually connected to a device that serves a particular purpose. For example, there may be an output port for operating the brake lights on the trailer and another output port for operating the right-hand turn signal and yet another for operating the left-hand turn signal. The trailer devices each may have a different operational current and a maximum current limit depending on its electrical characteristic. Also, electrical devices in a large trailer may draw more current than those in a small trailer. Consequently, a trailer tow connector designed to protect electrical devices in a large trailer may not be suitable for a small trailer.

In existing production trailer systems, trailer tow control circuitry is distributed through several electronic modules or may be encapsulated in a single body or trailer specific module. In these applications short or over current protection is limited to fixed value fuses or circuit breakers that are installed in the vehicle at time of assembly. Also, in many cases, trailer circuit switching devices are fused relays controlled by a high current ignition switch. Furthermore, many vehicles tow several trailers of varying size and features. A family SUV or truck may tow a small jet ski trailer (3 trailer circuits), a landscape flatbed trailer (4 trailer circuits) or a RV trailer (5 trailer circuits). Additionally, when a trailer is not attached to the tow vehicle the owner may attach a hitch lighting device (1-3 trailer circuits) for cosmetic or vehicle personalization. All of these trailers and hitch lighting devices have different operational current loads. For smaller trailers, the installed fuse may not protect the wiring in the trailer since the design short circuit protection is typically for a worst case scenario, which is based on the largest possible towable trailer allowed for that vehicle. Consequently, the fused or other fixed circuit protection device used generally detects hard shorts (direct shorts to ground) and does not protect against soft shorts (low ohmic shorts to ground) or other high current related malfunctions in trailer equipment. Furthermore, today's trailer tow designs offer protection without detection or annunciation of a short circuit condition or other malfunction to the driver.

Existing trailer tow connectors typically lack the capability to intelligently detect and classify electrical loads. Consequently, existing trailer tow connectors lack the capability to intelligently determine short circuit current limits based on the attached electrical device. Also, existing trailer tow connectors lack the capability to intelligently initiate load shedding in response to a short circuit condition as well as providing a resettable short circuit protection design.

SUMMARY OF THE EMBODIMENTS

An integrated circuit device and method for classifying electrical devices is disclosed. The electrical devices each receive power from an output port of a respective power control circuit coupled to a battery. The method includes determining a reference current response of a plurality of electrical devices. The reference current response includes a reference in-rush current and a reference steady state current as a function of time. The reference current response is based on the characteristic of the electrical devices. The method includes storing the reference current response of the electrical devices in a memory. The method includes measuring a real-time current response of a specific electrical device. The real time current response includes a real-time in-rush current and a real-time steady state current as a function of time. The method includes storing the measured real-time current response of the specific electrical device in the memory. The method includes comparing, by a processor, the measured real-time current response of the specific electrical device to the reference current responses of the plurality of electrical devices and classifying the electrical device based on the comparison. A learned short circuit protection method is also provided that calculates a continuous short circuit limit value based on detected loads and calculated average load currents.

BRIEF DESCRIPTION OF THE DRAWINGS

For a more complete understanding of the features, example embodiments and possible advantages of the present invention, reference is now made to the detailed description of the invention along with the accompanying figures and in which:

FIG. 1A is a simplified diagram of a trailer tow connector;

FIG. 1B is a simplified diagram of an electronic circuit installed in the trailer tow connector of FIG. 1A;

FIG. 4 is a flow diagram of an exemplary method for determining a valid classification of an electrical device.

DETAILED DESCRIPTION OF THE DRAWINGS

Figure 2:
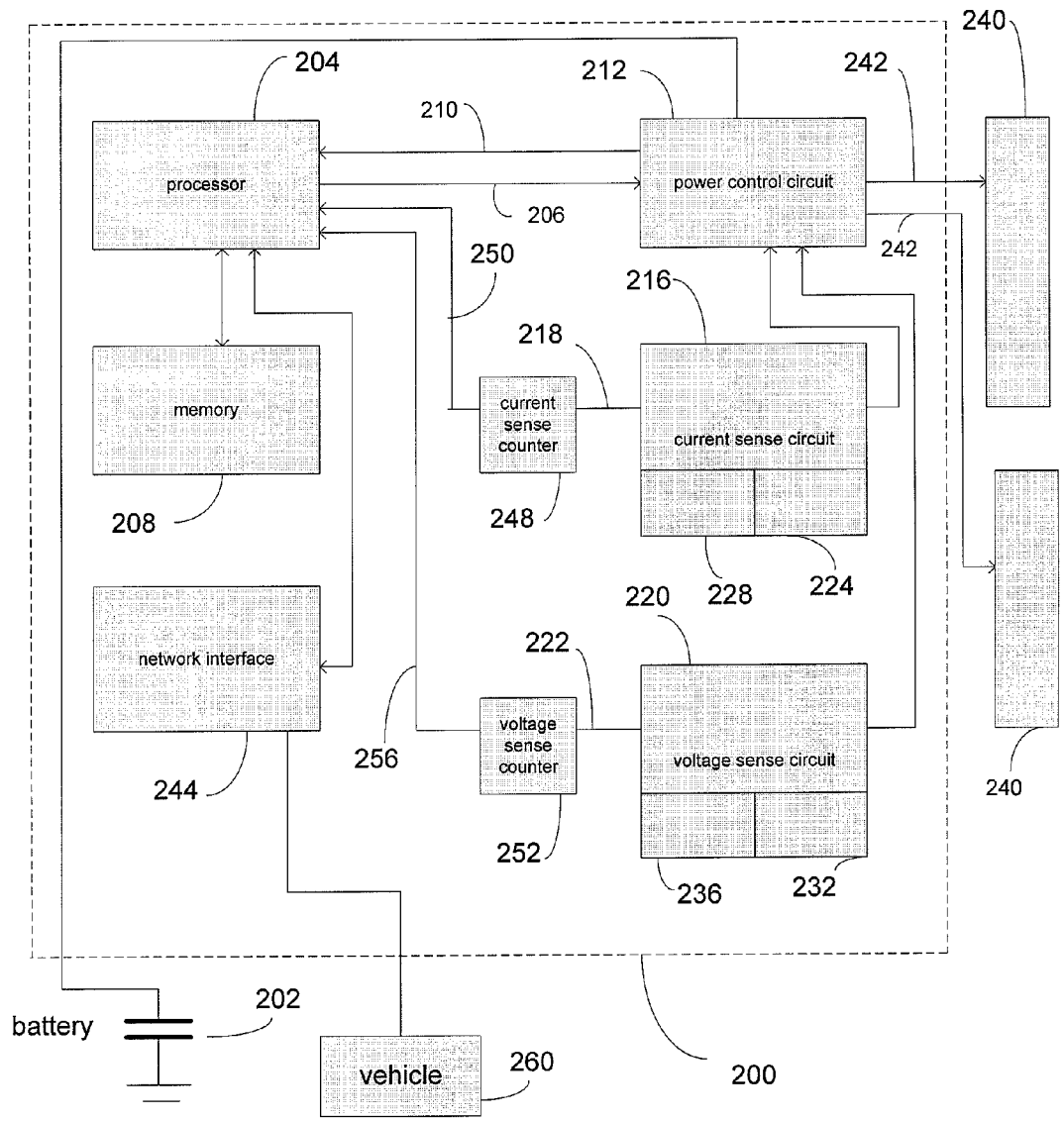
FIG. 2 illustrates an example implementation of a circuit for classifying electrical devices.

This application incorporates by reference for all purposes, U.S. patent application Ser. No. 10/967,389 (Publication No. 2006/0085099 A1) entitled Method and System for Driving a Vehicle Trailer Tow Connector, and filed Oct. 18, 2004. This application also incorporates by reference for all purposes U.S. patent application Ser. No. 12/038,936 (Publication No. 2008/0204033 A1) entitled Integrated Circuit and Method for Monitoring and Controlling Power and for Detecting Open Load State, and U.S. patent application Ser. No. 12/039,015 (Publication No. 2008/0203975 A1) entitled Integrated Circuit and Method for Preserving Vehicle's Battery Charge and Protecting Trailer Load, both filed on Feb. 28, 2008.

FIG. 1A shows a trailer tow connector 104 that may be installed in a vehicle designed to tow a trailer. The trailer tow connector 104 includes an electronic circuit 108 shown in FIG. 1B. Although the electronic circuit 108 is shown separately, it will be understood that the electronic circuit 108 typically resides inside (for example, encapsulated or housed within) the trailer tow connector 104. The electronic circuit 108 includes one or more electronic devices 112 operable to deliver power to the devices in the trailer. The electronic circuit 108 may be installed on a PC board 116, which is securely installed inside the trailer tow connector 104. The electronic circuit 108 includes one or more output ports or pins 120 that are each connected to a particular device in the trailer.

FIG. 2 illustrates an example implementation of a circuit 200 for classifying electrical devices 240 each receiving power from an output port 242 of a respective power control circuit 212 coupled to a battery 202. The circuit 200 is configured to intelligently determine short circuit current limits for the electrical devices 240. The circuit is powered from a power supply which may comprise, for example, the battery 202 of a vehicle within which the circuit 200 and connector 104 is installed.

The load may be a resistive, inductive, capacitive, a battery or any other type of load installed in a trailer that is towed by a vehicle. For example, the load may be a trailer lighting load (LED, incandescent, Xenon, etc.) or a trailer battery with trailer installed loads. The trailer battery, which is separate from the vehicle battery, refers to a battery installed in the trailer to power trailer installed loads.

It will be apparent to those skilled in the art that the circuit 200 may be utilized in aircraft power systems, telecommunications, networking, wireless and other applications.

The circuit 200 may be implemented as an integrated circuit device fabricated on a semiconductor substrate. Alternatively, the circuit 200 may be implemented with discrete, stand-alone components.

The circuit 200 includes a processor 204 coupled to a memory 208. The processor 204 may be one of several commercially available microcontrollers programmed to execute data processing tasks. In particular, the processor 204 is configured to receive data from, and store data in, the memory 208. The processor 204 performs a plurality of mathematical and/or logical operations on data received from both the memory 208 and from other components of the circuit 200 by executing a plurality of instruction codes.

The circuit 200 includes a switched power control circuit 212 electrically coupled to the battery 202 and the processor 200. The switched power control circuit 212 controls the power delivered to one or more load(s) 240 in response to a power control signal 206 from the processor 204. The load(s) 240 may be electrically coupled to the switched power control circuit 212 via an associated output port 242. Although only one power control circuit is shown in FIG. 2, it will be understood that there may be a plurality of power control circuits each configured to regulate power in a specific electrical device. Alternately, a plurality of power control circuits may be implemented as a single device as shown in the power control circuit 212.

The switched power control circuit 212 may optionally provide a feedback signal 210 to the processor 204. In one example implementation, the switched power control circuit 204 is a power semiconductor device such as a power MOSFET or a power integrated base transistor capable of delivering controlled power to the load 240. In response to the power control signal 206 from the processor 204, the duty cycle of the power control circuit 212 is varied to regulate the amount of power delivered to the load 240. In one example implementation, the power control signal 206 is a pulse width modulated signal with a varied duty cycle to control the ON and OFF times of the switched power control circuit 212.

The circuit 200 includes a current sense circuit 216 configured to measure the current flowing in the power control circuit 212 and being delivered to each of the loads 240. The current sense circuit 216 may be incorporated into the switched power control circuit 212. Alternatively, the current sense circuit 216 may be a separate, stand-alone circuit configured to measure the current flowing to the load(s) 240. The current sense circuit 216 measures the current flowing to a given load 240 and provides a current sense signal 218 in response to the measured current. As will be subsequently discussed, if the measured current is greater than a maximum current threshold, the current sense signal 218 may indicate a short circuit condition, prompting the processor 204 to remove power from the load 240.

In one example implementation, the current sense circuit 216 includes a reference current generator 224 that generates a reference current. The current sense circuit 216 also includes a comparator circuit 228 that compares the measured current flowing to the load 240 to the reference current, and responsive to the comparison generates the current sense signal 218. The reference current may be the maximum current threshold or any other selected current value. The current sense signal 218 indicates the operating condition at the output port 242 including any possible malfunction. More specifically, the current sense signal 218 may indicate a short circuit state or may indicate normal operating condition.

In one example implementation, a counter circuit 248 may be used to validate a short circuit condition. This circuit 248 is optionally included, or optionally considered. Signal 218 may be alternatively fed directly to processor 204. Multiple samples of current are taken. The counter circuit 248 may be incremented by the signal 218 for each successive detected short circuit condition during the sampling period. When the count exceeds a maximum threshold, the counter circuit 248 may provide a valid short circuit state signal 250 to the processor 204. The counter circuit 248 will be reset in the absence of the detection of a successive short circuit condition (for example, within the sampling period). Responsive to the valid short circuit state signal 250 from the counter circuit 248, the processor may detect and report a valid short circuit state condition.

The circuit 200 includes a voltage sense circuit 220 configured to measure the voltage applied by the power control circuit 212 across the load 240. The voltage sense circuit 220 may be incorporated into the switched power control circuit 212. Alternatively, the voltage sense circuit 220 may be a separate, stand-alone circuit configured to measure the voltage applied across the load 240. The voltage sense circuit 220 measures the voltage across the load 240 and provides a voltage sense signal 222 in response to the measured voltage. If the measured voltage is greater than a predetermined voltage value, the voltage sense signal 222 may indicate an over voltage condition. Also, if the measured voltage is less than a predetermined voltage value, the voltage sense signal 222 may indicate a low battery voltage condition. Additionally, the voltage sense signal 222 may also indicate a short condition if the voltage is below a threshold (e.g., below the applied battery voltage) when the power control circuit 212 is in the off state.

In one example implementation, the voltage sense circuit 220 includes a reference voltage generator 232 that generates a reference voltage signal. The voltage sense circuit 220 also includes a voltage comparator circuit 236 that compares the measured voltage across the load 240 to the reference voltage, and responsive to the comparison generates the voltage sense signal 222.

In one example implementation, a counter circuit 252 may be used to validate an over voltage condition or a low battery voltage condition. This circuit 252 is optionally included, or optionally considered. Signal 222 may be alternatively fed directly to processor 204. Multiple samples of voltage are taken by circuit 220 with corresponding multiple signals 222 being generated. The counter circuit 252 may be incremented by the signal 222 for each successive detected over voltage condition. When the count exceeds a maximum threshold, the counter circuit 252 may provide a valid over voltage state signal 256 to the processor 204. The counter circuit 252 will be reset in the absence of the detection of a successive over voltage condition (for example, within the sampling period). Responsive to the valid over voltage signal, the processor 204 may detect and report an over voltage condition.

In one example implementation, the circuit 200 includes a network interface circuit 244 for facilitating communication between the processor 204 and external devices (not shown in FIG. 2). For example, the network interface circuit 244 may facilitate communication between a vehicle (not shown in FIG. 2) and a trailer tow connector incorporating the circuit 200. This interface allows the processor 204 to output communications, such as detections of open load, short circuit or over voltage conditions at the ports 242 and loads 240, to other devices and systems. The interface further allows the processor 204 to receive information, such as programming, command and control information, from other devices and systems.

Figure 3:
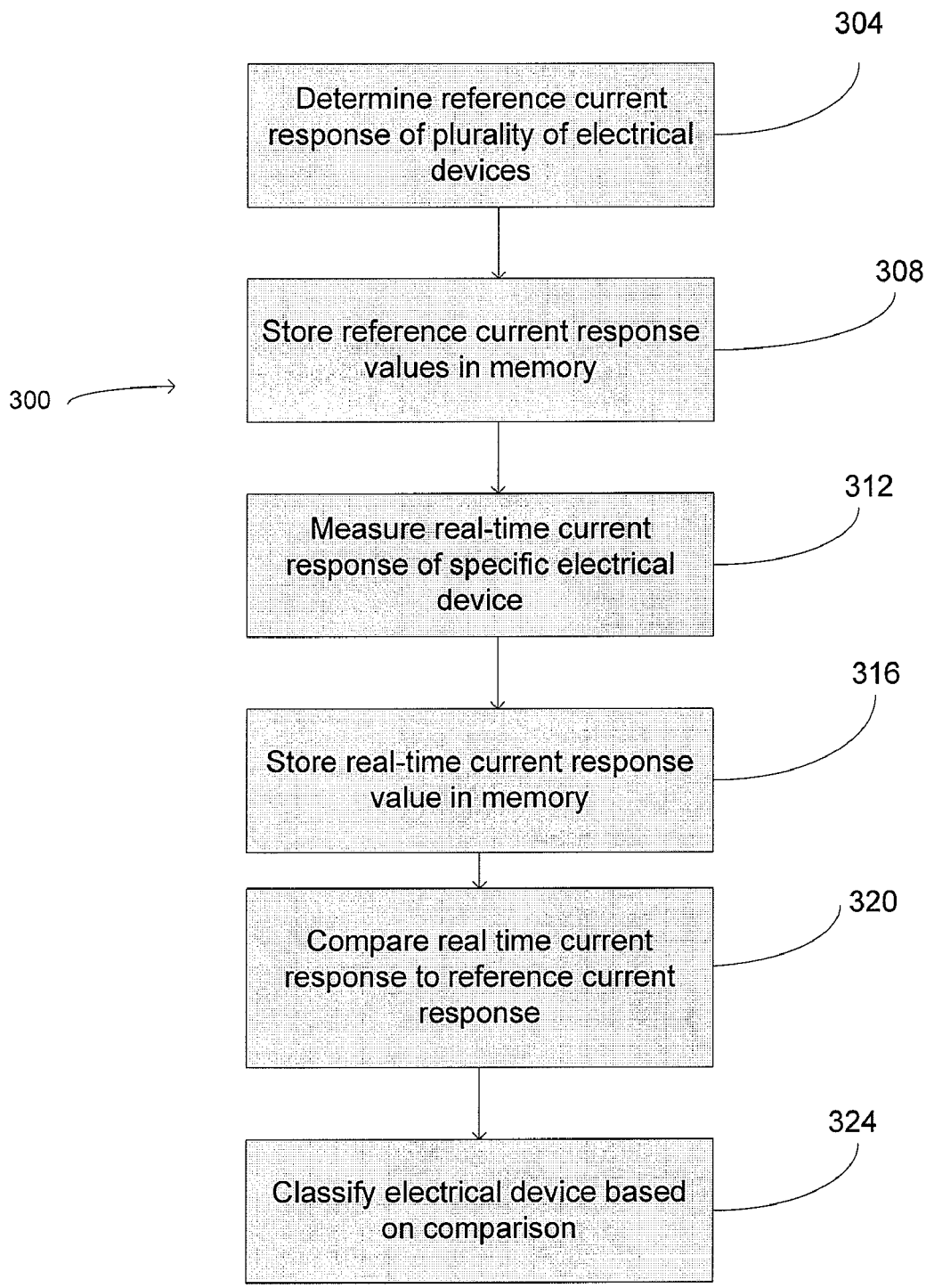
FIG. 3 is a flow diagram of an exemplary method for classifying electrical devices.

FIG. 3 is a flow diagram 300 of an exemplary method for classifying the electrical devices (loads) 240 each receiving power from the output port of a power control circuit 212 coupled to the battery 202. The method of FIG. 3 may be executed by the circuit 200 shown in FIG. 2.

As discussed before, the circuit 200 may be incorporated in a trailer tow connector for intelligently classifying electrical devices 240 installed in a trailer attached to a vehicle. Based on the classification of the electrical devices 240, the circuit 200 intelligently estimates the short circuit current limit for the electrical devices based on each device's current response characteristic.

It will be apparent to those skilled in the art, that the method illustrated in the flow diagram 300 can be utilized in aircraft power systems, telecommunications, wireless, networking and other electrical applications.

In step 304, a reference current response of a plurality of electrical devices is determined in a first operating mode. In one example implementation, the reference current responses are used for load classification if the loads attached to the power control circuit 212 have not been previously classified and an attached load 240 or a trailer has been detected. If no attached load is detected, all load classification information as well as learned short circuit values will be cleared or reset.

Each electrical device may have a distinct reference current response. The electrical device may be an incandescent lamp, a gas discharge lamp, an LED, a battery or any other type of electrical load installed in the trailer. As will be understood by those skilled in the art, the reference current response is based on each device's electrical characteristic. In one implementation, the reference current response is measured when the power control circuit 212 is first turned on. The reference current response provides a current versus time response of the device and includes an initial current prior to output turn on, an in-rush current response, a settling current response and an average current response.

In step 308, the plurality of reference current response values are stored in the memory 208. In one implementation, since in-rush characteristics are dependent on the temperature of the attached load, an output off timer may be utilized to qualify that the attached load as 'cold'. Note that certain loads may have ten times the in-rush current when cold versus warm (recently been on) loads are evaluated. Based on the implementation of an output off timer only cold loads would be subject to the classification process.

In one example implementation, the reference current responses of the plurality of devices are pre-stored in the memory. Thus, the steps 304 and 308 of the first mode are not performed.

A second operating mode is also provided. In step 312, a real-time current response of a specific electrical device is measured. It is an object of the method 300 to classify this specific electrical device and estimate its short circuit current limit. The measured real-time current response provides a current versus time response as measured by the current sense circuit 216 and includes a real-time in-rush current response, a real-time settling current response and a real-time average current response. The average current response may be computed by the processor 204 from a plurality of measured current values. In step 316, the measured real-time current response is stored in the memory 208.

In step 320, the measured real-time current response is compared to the plurality of the reference current response values. In one implementation, the processor 204 compares the measured real-time current response to the reference current response values. Based on the comparison, the specific electrical device is classified in step 324.

Example CLASSIFICATION

Table I below contains an example reference current response of several selected electrical devices (perhaps obtained through first mode operation). The data in Table I is typical and based on a limited but representative sampling of load variations and manufacturers.

TABLE I

STORED REFERENCE CURRENT RESPONSES

| DEVICE | CURRENT (t − 1) | CURRENT (t) | CURRENT (t + 1) | CURRENT (t + 2) | CURRENT (t + 3) | AVERAGE CURRENT |
| --- | --- | --- | --- | --- | --- | --- |
| INCANDESCENT | 0 | 37 | 25 | 15 | 6 | 4.2 |
| GAS DISCHARGE | 0 | 45 | 37 | 32 | 25 | 6.0 |
| LED | 0 | 3.2 | 3.1 | 3.1 | 3.0 | 2.9 |
| BATTERY | 0 | 1.5 | 1.3 | 1.3 | 1.3 | X |

Table II below contains an example of measured real-time current responses of electrical devices, namely Output 1 and Output 2 (from second mode operation).

TABLE II

MEASURED CURRENT RESPONSE

| DEVICE | CURRENT (t − 1) | CURRENT (t) | CURRENT (t + 1) | CURRENT (t + 2) | CURRENT (t + 3) | AVERAGE |
| --- | --- | --- | --- | --- | --- | --- |
| OUTPUT 1 | 0.2 | 28 | 17 | 9 | 6.3 | 5.0 |
| OUTPUT 2 | 0.1 | 4.3 | 4.0 | 4.1 | 3.9 | 4.0 |

In Tables I and II, the current is sampled 5 times at a time interval t=10 ms. If desired, the Tables may also include other values such as maximum short circuit current values and random values. The maximum short circuit current represents the electrical device's maximum current limit, which is based on the device's characteristic and circuit design including PCB layout. The random values are inconsistent current readings that deviate from an expected current versus time plot, and are thus ignored in the analysis.

The example current responses contained in Tables I and II for classification purposes are under cold lamp conditions (i.e., cold load at prevailing ambient temperature). It will be apparent to those skilled in the art that a similar table containing current responses under warm load conditions can be created for analysis, if necessary. Also, a current response under a cold-warm condition can be obtained by sequentially pulsing the electrical device for classification purpose.

The data in Tables I and II are analyzed for classification of the Outputs I and II. In one example implementation, the delta or difference values of the reference current response times are compared to the corresponding values of the measured current response times. Table III below contains the delta values.

A comparison of the delta values of Output I to the delta values of the reference devices, namely an incandescent lamp, a gas discharge lamp and an LED, indicates that Output I is more similar to the incandescent lamp than the other reference devices. Thus, a determination can be made that Output I is an incandescent lamp. Output II, conversely, would appear to be more like a LED.

In one example implementation, the delta values are divided into two comparative periods, initial turn on time period (t−1, t, and t+1) and settling time period (t+3, average current, steady state period). Next, for the initial turn on time period, the delta values of Output I are compared to the delta values of the reference current, and a classification is made subject to a subsequent validation. Thus, for example based on a comparison of the delta values in the initial turn on time period, Output I may be classified as an incandescent lamp pending a subsequent validation. Next, based on a comparison of the delta values in the settling time period, Output I may again be classified as an incandescent lamp. Since, both comparisons provides the same result, Output I may be validly classified as an incandescent lamp. If both comparisons did not provide the same result, a report indicating a failed classification state may be generated.

Likewise, Output II may be validly classified as an LED using the foregoing methods. As will be apparent, the various values in Tables I-III may be normalized prior to any analysis.

TABLE III

Delta Values

| DEVICE | DELTA CURRENT (t − 1) | DELTA CURRENT (t) | DELTA CURRENT (t + 1) | DELTA CURRENT (t + 2) | CURRENT (t + 3) | AVERAGE CURRENT | STEADY STATE DIFFERENCE |
| --- | --- | --- | --- | --- | --- | --- | --- |
| OUTPUT I | 0 | 27.8 | −11 | −8 | 6.3 | 5.0 | 1.3 |
| OUTPUT II | 0 | 4.2 | −0.3 | 0.1 | 3.9 | 4.0 | −0.1 |
| INCANDESCENT | 0 | 37 | −12 | −10 | 6.0 | 4.2 | 1.8 |
| GAS DISCHARGE | 0 | 45 | −8 | −5 | 25 | 6.0 | 19.0 |
| LED | 0 | 3.2 | −0.1 | 0 | 3.0 | 2.9 | 1.1 |

In one example implementation, all electrical devices or loads installed in a trailer may be classified according to the foregoing methods. Based on the classification of all electrical devices installed in a trailer, the type of trailer can be determined. For example, based on the number of electrical devices and the type (e.g., incandescent lamp, LED, gas discharge lamp), the type of trailer (e.g., light duty trailer, utility trailer, RV trailer, European trailer) can be determined. Furthermore, if multiple trailers are being towed by a vehicle, the foregoing method can be advantageously used to determine the type of the trailers. Additionally, the classification process will detect hitch lighting devices as a type of attached load but not as a trailer.

FIG. 4 is a flow diagram 400 of an exemplary method for determining a valid classification of a specific electrical device based on the method illustrated in FIG. 3. In step 404, a determination is made if the measured in-rush current is similar to the reference in-rush current. If the measured in-rush current is similar to the reference in-rush current, in step 408 a potential first classification is assigned to the specific electrical device. The assigned potential first classification indicates that the specific electrical device may potentially be a first type of electrical device (e.g., incandescent lamp, LED, gas discharge) subject to a subsequent validation.

In step 412, a determination is made if the measured steady state current is similar to the reference steady state current. If the measured steady state current is similar to the reference steady state current, in step 416 a potential second classification is assigned to the specific electrical device. The assigned potential second classification indicates that the specific electrical device may potentially be a second type of electrical device (e.g., incandescent lamp, LED) subject to validation. In step 420, the assigned first and second classifications are compared. If the assigned first and second classifications are same, in step 424, a valid classification is assigned to the specific electrical device. The valid classification identifies the specific electrical device. In step 428, the processor reports the valid classification. If the assigned first and second classifications are not same, the processor reports an invalid or failed classification. In one example implementation, the processor reports the classification via the vehicle communication network 244.

Figure 5A:
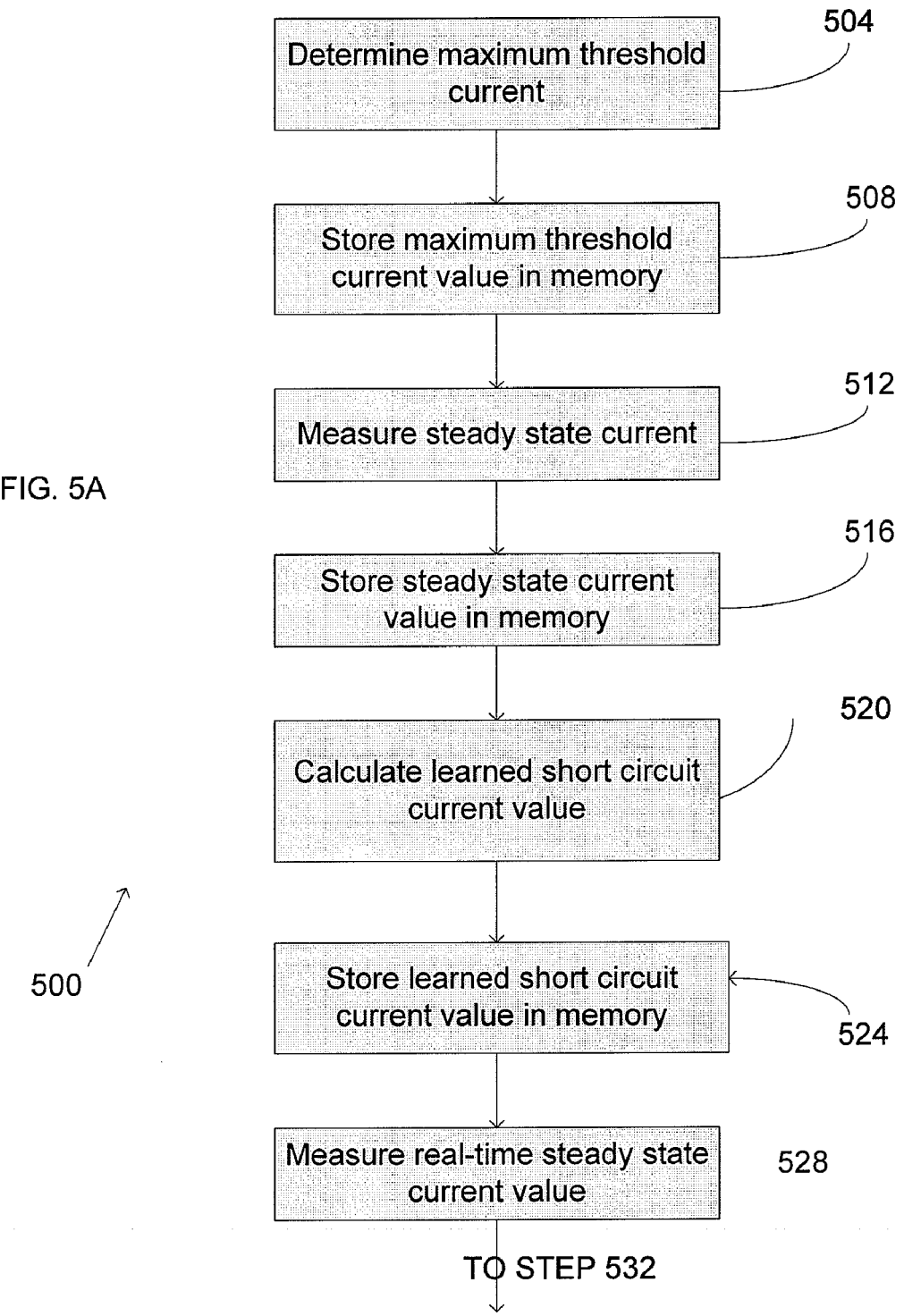
FIG. 5 is a flow diagram of an exemplary method for determining short circuit limits for an electrical device.
Figure 5B:
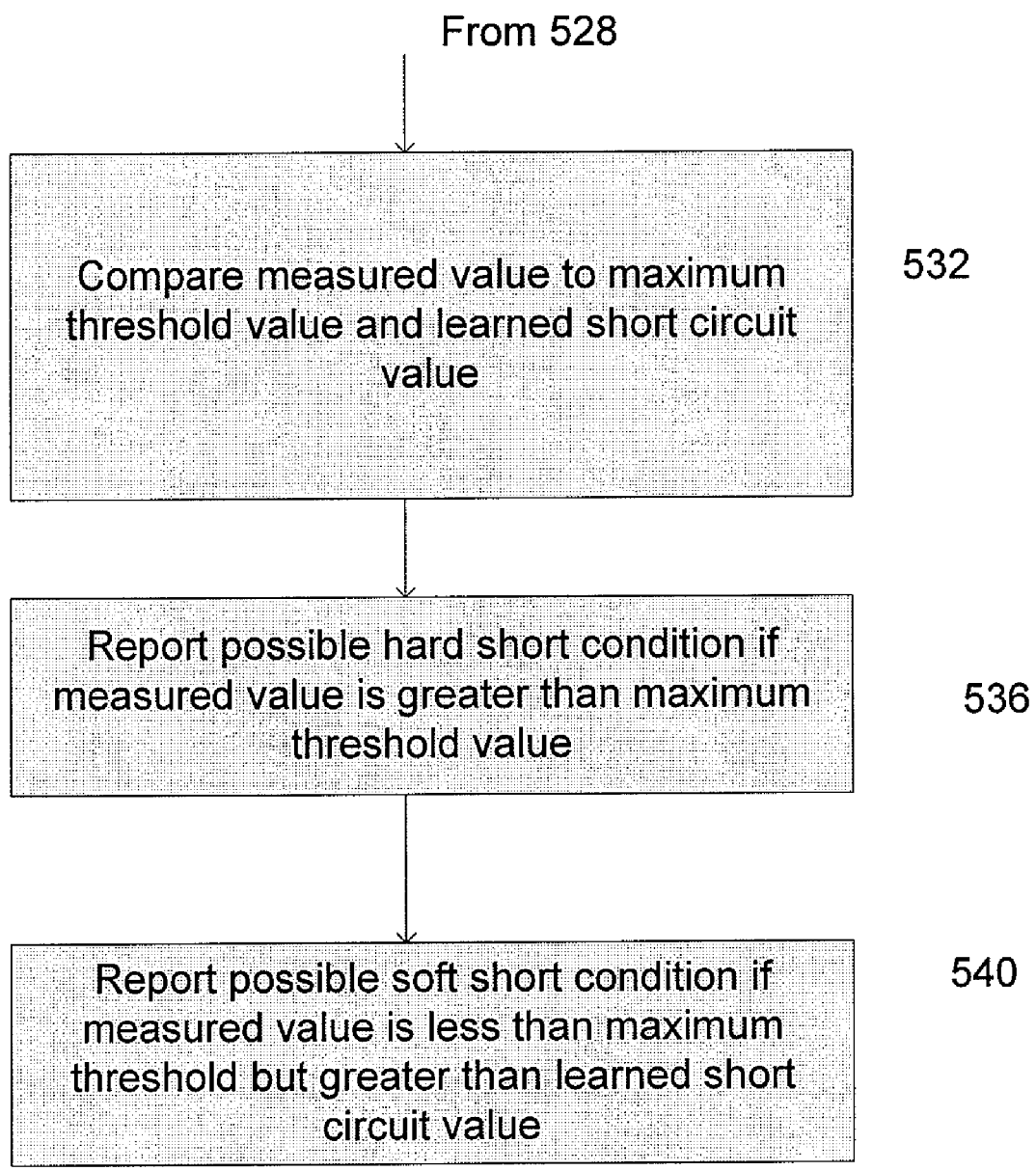

FIGS. 5A-5B illustrate a flow diagram 500 of an exemplary method for estimating short circuit limits for the electrical devices 240. In step 504, a maximum threshold current for the output port 242 is determined. The maximum threshold current value is the maximum permissible current that may flow through the output port 242 without causing damage to the output port 242, the trailer connector 104 or any attached wiring. In step 508, the maximum threshold current value is stored in the memory 208 and is a current limit that is always valid and evaluated.

In step 512, the steady state current flowing in the electrical device 240 is measured for n number of times at selected time intervals. In one implementation step 512 is initiated when an attached load or a trailer is detected. The detection of a load also initiates the learn process (or learn mode). If all loads become unattached, the learn process for short circuit current is stopped, the learned values are cleared and the maximum threshold current is evaluated for short circuits. In step 516, the measured steady state current values are stored in the memory 208. In step 520, a learned short circuit current value for the output port 242 is calculated from the steady state current values. In one implementation, the learned short circuit current value is calculated by the processor 204. The learned short circuit current value depends on the characteristic of the electrical device 240. The method of calculating the learned short circuit current is subsequently discussed. In step 524, the learned short circuit current value is stored in the memory 208.

An operation mode is then entered. In step 528, the steady-state current flowing in the electrical device 240 is measured. In one implementation, the current sense circuit 216 measures the steady state current flowing in the electrical device 240 in real-time. In step 532, the measured real-time steady state current value is compared to the maximum threshold current value and the learned short circuit current value.

In one implementation, the average current value is used to calculate the learned short circuit current value which is then compared to the load current value. Based on design requirements the load current value may be the measured load current (a raw value), the steady state current (filtered) or the average load current. The measured steady state current values are stored in the memory 208. In one implementation, a subset of the steady state current values are selected by the processor 204. In one example implementation, the processor may select the subset by filtering or rejecting all current values outside an acceptable range of values. The filtering may be based on a fixed or calculated deviation from the calculated average current value or the measured load current value. The processor 204 may filter all transient current values caused by an electrostatic discharge, or other electrical transients caused by load dumps, electrical noise, electromagnetic disturbances or vehicle jump starts. Alternatively, the processor 204 may filter the steady state current values outside a standard deviation of a previously calculated average current value.

If the measured steady state current is greater than the maximum threshold current, the processor 204 reports a possible hard short circuit condition at the output port 242 in step 536. A hard short circuit condition may indicate a direct short to ground condition. If the measured steady state current is greater than the learned short circuit current but less than the maximum threshold current, the processor 204 reports a soft short circuit condition in step 540. A soft short circuit condition may indicate a low ohmic short to ground condition or abnormal conditions related to load, wiring problems or other vehicle problems.

The method for calculating the learned short circuit limit is now explained. In one implementation, the processor 204 calculates an average steady state current value from the plurality of measured steady state currents. The average steady state current value is stored in the memory. The learned short circuit current is calculated by multiplying the average steady state current value with a selected percentage or fractional number (e.g., 0.85, 0.75). The learned short circuit current is less than the hard short circuit current but greater than the soft short circuit current.

In one example implementation, the current sense counter 218 may be used to validate the hard short circuit condition and/or the soft short circuit condition. For example, the counter 218 may be incremented for each reporting of a potential hard short circuit condition. If the count value in the counter exceeds a preselected maximum limit, a valid hard short circuit condition may be reported by the processor 204. Likewise, a valid soft short circuit condition may also be determined and reported. In one example implementation, measurements may be taken to check for possible soft short circuit condition at 300 ms intervals with a maximum count limit for validation set at 25. In one example implementation, measurements may be taken for possible hard short circuit condition at 100 ms intervals and the maximum count for validation may be set at 10.

In response to a valid hard short circuit condition, the circuit 200 may initiate intelligent lead shedding to protect the electrical devices 240. In one example implementation, in response to a valid hard short circuit condition, the processor 204 may send a power control signal 206 to adjust the duty cycle of the power control circuit 212 to remove power from one or more output ports 242. Also, in response to a valid soft short circuit condition, the processor 204 may send a power control signal 206 to adjust the duty cycle of the power control circuit 212 to decrease the voltage at one or more output ports 242. In one implementation, the processor 204 reports various conditions (e.g., hard short circuit condition, soft short circuit condition) via the network interface 244.

In one example implementation, after the loads are classified, each load is assigned a preset short circuit limit, thus obviating the need for a learned short circuit calculation. Each load may be assigned a short circuit limit based on its electrical characteristic. The preset short circuit limit values may be stored in the memory 208 to be accessed by the processor 204.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A method for classifying as to type electrical devices adapted to receive power from an output port of a respective power control circuit coupled to a battery, comprising:
    storing reference current responses of different types of electrical devices in a memory, wherein the reference current responses include reference in-rush currents as a function of time;
    calculating a first steady state current from the reference current responses;
    calculating a second steady state current from a measured real-time current response of a specific electrical device, wherein the measured real-time current response includes a real-time in-rush current;
    comparing, by a processor, the measured real-time current response of the specific electrical device to the reference current responses;
    classifying the specific electrical device as having a first classification type based on the current response comparison;
    comparing the first steady state current to the second steady state current of the specific electrical device; and
    classifying the specific electrical device as having a second classification type based on the steady state current comparison.

2. The method according to claim 1, further comprising:
    comparing the first classification type to the second classification type;
    if the first and second classification types are the same, assigning a valid classification type to the specific electrical device, the valid classification type identifying the specific electrical device-type; and
    reporting the valid classification type.

3. The method according to claim 2, further comprising reporting an invalid classification type if the first and second classification types are different.

4. The method according to claim 3, wherein the classification types of the electrical devices are reported via a vehicle communication network.

5. The method according to claim 1, wherein the electrical devices relate to trailers towed by a vehicle, the method further comprising:
    classifying types of the plurality of electrical devices adapted to receive power from the battery; and
    identifying a trailer-type based on the classification types of the plurality of electrical devices.

6. The method according to claim 1, wherein the classification type identifies the electrical devices as an incandescent bulb, a gas discharge bulb, an LED, or a battery.

7. The method according to claim 1, further comprising:
    determining a maximum threshold current for the output port to which the electrical device is connected, the maximum threshold current being a short circuit current limit at the output port and being based on the characteristic of the output port;
    measuring a third steady state current flowing in the electrical device for pre-selected times;
    calculating, by the processor, a learned short circuit threshold current value from the third steady state current values, the learned short circuit current value being less than the maximum threshold current value;
    comparing the second steady state current to the maximum threshold current and to the learned short circuit current;
    if the second steady state current is greater than the maximum threshold current, reporting a hard short circuit condition at the output port; and if the second steady state current is more than the learned short circuit current but less than the maximum threshold current, reporting a soft short circuit condition at the output port.

8. The method according to claim 7, wherein the calculation of the learned short circuit current value comprises:
calculating, by the processor, an average steady state current value; and
determining the learned short circuit current value by multiplying the average steady state current value with a pre-selected fractional number.

9. The method according to claim 7, further comprising:
repeating measurement of the second steady state current flowing in the electrical device; and
comparing the second steady state current to the maximum threshold current and to the learned short circuit current.

10. The method according to claim 9, further comprising:
incrementing a first counter if the second steady state current is greater than the maximum threshold current; and
reporting a valid hard short circuit condition if the count value of the first counter exceeds a first count.

11. The method according to claim 10, further comprising removing power from the output port by reducing duty cycle of the power control circuit responsive to the valid hard short circuit condition.

12. The method according to claim 9, further comprising:
incrementing a second counter if the second steady state current is more than the learned short circuit current but less than the maximum threshold current; and
reporting a valid soft short circuit condition if the count value of the second counter exceeds a second count.

13. An integrated circuit device for classifying as to type electrical devices adapted to receive power from an output port of a respective power control circuit coupled to a battery, comprising:
a memory adapted to store a reference current response of different types of electrical devices, wherein the reference current response includes a reference in-rush current as a function of time;
a processor electrically coupled to the memory, the processor adapted to calculate a first steady state current from the reference current response;
a power control circuit adapted to be electrically coupled to an electrical device, the power control circuit adapted to control the power delivered to the electrical device responsive to a power control signal from the processor;
a current sense circuit adapted to be electrically coupled to the electrical device, the current sense circuit adapted to measure the current flowing in the electrical device and provide a current sense signal representative of the measured real-time current response to the processor; and
the processor further adapted to calculate a second steady state current from the measured real-time current response, classify the electrical device as to a first classification type by comparing the stored reference current response to the measured real-time current response, and classify the electrical device as to a second classification type by comparing the first steady state current to the second steady state current.

14. The integrated circuit device of claim 13, wherein the power control signal is a pulse width modulated signal adapted to control a duty cycle of the power control circuit.

15. The integrated circuit device of claim 13, wherein the processor is further adapted to decrease a duty cycle of the power control circuit responsive to the current sense signal indicating a short circuit condition at the output port.

16. The integrated circuit device of claim 13, wherein the power control circuit, the processor and the memory are implemented in a trailer tow connector adapted to regulate power in one or more types of electrical devices adapted to be installed in a trailer attached to a vehicle.

17. The integrated circuit device of claim 13, wherein the battery is adapted to be installed in a vehicle adapted to tow a trailer and wherein the power control circuit, the processor and the memory are adapted to be implemented in a trailer tow connector.

18. A method for identifying a short circuit state at an output port of a trailer tow connector having a plurality of output ports each configured to provide power to an electrical device installed in a trailer attached to a vehicle, the trailer tow connector having a processing circuit coupled to a memory, the method comprising:
determining, by the processing circuit, a learned short circuit current value of the output port, the learned short circuit current value being based on a fractional value multiplied by the average of a plurality of measured steady state learn-phase load currents at the output port, the learn-phase load currents being continually determined while a load is connected;
storing the learned short circuit current value in the memory;
measuring the load current at the output port with a measurement circuit;
comparing, by the processing circuit, the load current value to the learned short circuit current value; and
identifying the short circuit condition based on the comparison.

19. The method according to claim 18, wherein the load current is the steady state current.

20. The method according to claim 18, wherein the load current is the average value of a plurality of sampled current values.

21. The method according to claim 18, wherein the determination of the learned short circuit current further comprises:
measuring a plurality of the steady state learn-phase load current at the output port for a selected number of times at selected time intervals;
storing the plurality of measured steady state learn-phase load current values in the memory;
selecting, by the processor, a subset of the steady state learn-phase load current values;
generating the learned short circuit current by multiplying an average of the subset of the steady state learn-phase current values with the fractional value.

22. A method for classifying as to type electrical devices adapted to receive power from an output port of a respective power control circuit coupled to a battery, comprising:
storing reference current responses of different types of electrical devices in a memory, wherein the reference current responses include reference in-rush currents as a function of time;
calculating, by a processor, a steady state current from a measured real-time current response of a specific electrical device, wherein the measured real-time current response includes a real-time in-rush current;
determining if the measured in-rush current is substantially equal to the reference in-rush current;
assigning a potential first classification type to the specific electrical device if the measured in-rush current is substantially equal to the reference in-rush current, the assigned potential first classification type indicating that the specific electrical device may potentially be a first type of electrical device subject to validation;

determining if the steady state current is substantially equal to the reference steady state current;

assigning a potential second classification type to the specific electrical device if the steady state current is substantially equal to the reference steady state current, the assigned potential second classification type indicating that the specific electrical device may potentially be a second type of electrical device subject to validation;

comparing the potential first classification type to the potential second classification type;

assigning a valid classification type to the specific electrical device if the potential first and second classification types are the same, the valid classification type identifying the specific electrical device-type; and reporting the valid classification type.

23. The method according to claim 22, further comprising reporting an invalid classification type if the potential first and second classification types are different.

24. The method according to claim 23, wherein the classification types of the electrical devices are reported via a vehicle communication network.

25. A method for classifying as to type electrical devices adapted to receive power from an output port of a respective power control circuit coupled to a battery, comprising:

determining a maximum threshold current for the output port to which the electrical device is connected, the maximum threshold current being a short circuit current limit at the output port and being based on the characteristic of the output port;

measuring a steady state current flowing in the electrical device for pre-selected times;

calculating, by a processor, a learned short circuit threshold current value from the steady state current values, the learned short circuit current value being less than the maximum threshold current value;

measuring a real-time steady state current flowing in the electrical device;

comparing the measured real-time steady state current to the maximum threshold current and to the learned short circuit current;

reporting a hard short circuit condition at the output port if the measured real-time steady state current is greater than the maximum threshold current; and reporting a soft short circuit condition at the output port if the measured real-time steady state current is more than the learned short circuit current but less than the maximum threshold current.

26. The method according to claim 25, wherein the calculation of the learned short circuit current value comprises:

calculating, by the processor, an average steady state current value; and determining the learned short circuit current value by multiplying the average steady state current value with a pre-selected fractional number.

27. The method according to claim 25, further comprising:
repeating measurement of the real-time steady state current flowing in the electrical device; and comparing the measured real-time steady state current to the maximum threshold current and to the learned short circuit current.

28. The method according to claim 27, further comprising:
incrementing a first counter if the measured real-time steady state current is greater than the maximum threshold current; and reporting a valid hard short circuit condition if the count value of the first counter exceeds a first count.

29. The method according to claim 28, further comprising removing power from the output port by reducing duty cycle of the power control circuit responsive to the valid hard short condition.

30. The method according to claim 27, further comprising:
incrementing a second counter if the measured real-time steady state current is more than the learned short circuit current but less than the maximum threshold current; and reporting a valid soft short circuit condition if the count value of the second counter exceeds a second count.

31. A method for classifying as to type electrical devices adapted to receive power from an output port of a respective power control circuit coupled to a battery, comprising:

storing reference current responses of different types of electrical devices in a memory;

measuring a real-time current response of a specific electrical device;

comparing, by a processor, the measured real-time current response of the specific electrical device to the reference current responses of the plurality of electrical devices;

classifying the specific electrical device as to type based on the current response comparison;

determining a high threshold current for the output port to which the electrical device is connected, the high threshold current being a short circuit current limit at the output port and being based on the characteristic of the output port;

measuring a steady state current flowing in the electrical device for pre-selected times; and calculating a learned short circuit current value from the steady state current values, the learned short circuit current value being less than the high threshold current value.

32. The method as set forth in claim 31, further comprising:
measuring a real-time steady state current flowing in the electrical device;

comparing the measured real-time steady state current to the high threshold current and to the learned short circuit current;

reporting a hard short circuit condition at the output port if the measured real-time steady state current is greater than the high threshold current; and reporting a soft short circuit condition at the output port if the measured real-time steady state current is more than the learned short circuit current but less than the high threshold current.

33. The method as set forth in claim 32, wherein the calculation of the learned short circuit current value comprises:

calculating, by the processor, an average steady state current value; and determining the learned short circuit current value by multiplying the average steady state current value with a pre-selected fractional number.

34. The method as set forth in claim 32, further comprising:
repeating measurement of the real-time steady state current flowing in the electrical device; and comparing the measured real-time steady state current to the high threshold current and to the learned short circuit current.

35. The method as set forth in claim 34, further comprising:
incrementing a first counter if the measured real-time steady state current is greater than the high threshold current; and
reporting a valid hard short circuit condition if the count value of the first counter exceeds a first count.

36. The method as set forth in claim 35, further comprising removing power from the output port by reducing duty cycle of the power control circuit responsive to the valid hard short circuit condition.

37. The method as set forth in claim 34, further comprising:
incrementing a second counter if the measured real-time steady state current is more than the learned short circuit current but less than the high threshold current; and
reporting a valid soft short circuit condition if the count value of the second counter exceeds a second count.

* * * * *